E. P. BEAUCHAMP.
Cotton-Planter.

No. 24,984. Patented Aug. 9, 1859.

UNITED STATES PATENT OFFICE.

ELIJAH P. BEAUCHAMP, OF PRESTON, GEORGIA.

IMPROVEMENT IN COTTON-SEED PLANTERS.

Specification forming part of Letters Patent No. 24,984, dated August 9, 1859.

*To all whom it may concern:*

Be it known that I, ELIJAH P. BEAUCHAMP, of Preston, in the county of Webster and State of Georgia, have invented a new and useful Machine for Planting Cotton; and I do declare that the following is a clear, full, and exact description of the same, reference being had to the accompanying drawings, in which—

Figure 1:
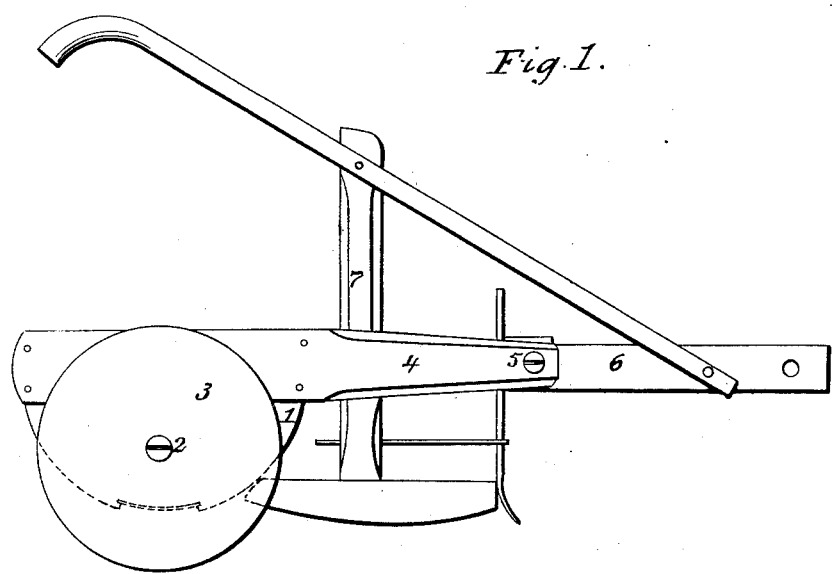
Figure 2:
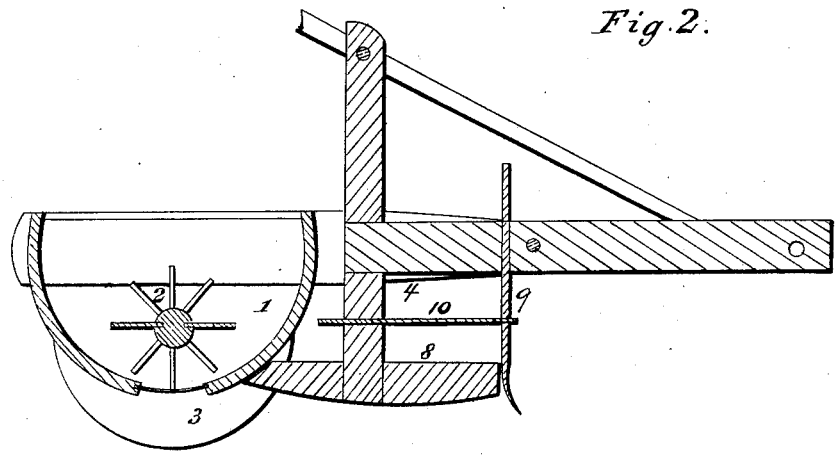

Figure 1 is a side elevation, and Fig. 2 a section through the center of Fig. 1.

No. 1 represents a box, which contains the seed, made in a simicircular shape, coming to a close at the bottom, with the exception of a space which is filled by two pieces of sheet-iron, so arranged as to open or close, so as to permit the escape of any desired amount of seed from one peck to three or four bushels per acre.

No. 2 is an axle, which passes through the box, with spikes affixed to the center of the axle, which passes the seed out through the groove formed by the gage or iron bottom. There are also four spikes on either side of the center spikes, which stir the seed to the center of the bottom. On each end of this axle is affixed a wheel, No. 3, permanently attached to the axle, so that the axle revolves with the wheel, thereby throwing the seed with great regularity.

The box No. 1 is attached to the hind end of the side pieces or frame 4. This frame is secured to the beam, as seen at 5, by a bolt, and is so constructed as to allow the beam 6 and stock 7 to move up and down freely between the side pieces. The wheels 3 carry the seed-box clear of the ground, being arranged to run on each side of the furrow made by the plow, as seen in the drawings.

9 is a furrow-opener. 8 is a follower to operate 9, and is constructed of wood, as shown in the drawings. 10 is a brace attached to stock 7 and opener 9 for the purpose of securing the latter more firmly in place.

In operation this machine is easily managed by the most common hand, sows the seed with great regularity, performs more work in a given time than can be done by the ordinary methods practiced, is cheaply constructed, and not liable to get out of repair.

What I claim, and desire to secure by Letters Patent, is—

The arrangement of the box 1, axle 2, wheel 3, side pieces or frame, 4, bolt 5, beam 6, stock 7, follower 8, furrow-opener 9, and brace 10, as described, for the purposes set forth.

ELIJAH P. BEAUCHAMP.

Witnesses:
JESSE HARRELL,
GEORGE M. HAY.